United States Patent
Bellett et al.

(10) Patent No.: US 10,387,018 B2
(45) Date of Patent: Aug. 20, 2019

(54) GEO-POSITIONING

(71) Applicant: GroundProbe Pty Ltd, Windsor, QLD (AU)

(72) Inventors: Patrick T. Bellett, Windsor (AU); Lachlan Campbell, Windsor (AU); David Noon, Windsor (AU)

(73) Assignee: GroundProbe Pty Ltd, Windsor, Queensland (AU)

( * ) Notice: Subject to any disclaimer, the term of this patent is extended or adjusted under 35 U.S.C. 154(b) by 134 days.

(21) Appl. No.: 15/536,870

(22) PCT Filed: Dec. 18, 2015

(86) PCT No.: PCT/AU2015/050809
§ 371 (c)(1),
(2) Date: Jun. 16, 2017

(87) PCT Pub. No.: WO2016/094958
PCT Pub. Date: Jun. 23, 2016

(65) Prior Publication Data
US 2017/0364250 A1    Dec. 21, 2017

(30) Foreign Application Priority Data
Dec. 18, 2014  (AU) ............................... 2014905133

(51) Int. Cl.
*G06F 3/0484*    (2013.01)
*G06T 3/00*    (2006.01)
(Continued)

(52) U.S. Cl.
CPC .......... *G06F 3/04845* (2013.01); *G01C 11/06* (2013.01); *G01C 11/10* (2013.01);
(Continued)

(58) Field of Classification Search
CPC ..... G06F 3/04845; G06T 7/33; G06T 3/0068; G06T 3/0006; G06T 2207/10028;
(Continued)

(56) References Cited

U.S. PATENT DOCUMENTS

| | | |
|---|---|---|
| 6,447,163 B1 | 9/2002 | Bani-Hashemi et al. |
| 2006/0041375 A1 | 2/2006 | Witmer et al. |

FOREIGN PATENT DOCUMENTS

| | | | |
|---|---|---|---|
| WO | 2009/015012 A2 | 1/2009 | |
| WO | WO-2013033787 A1 * | 3/2013 | ............. G01S 17/89 |

OTHER PUBLICATIONS

International Search Report (PCT/AU2015/050809), dated Feb. 12, 2016.
(Continued)

*Primary Examiner* — Amandeep Saini
(74) *Attorney, Agent, or Firm* — Howard & Howard Attorneys PLLC (57) ABSTRACT

The invention is a method of geo-positioning geographic data for visualization of a geographic area, particularly a mine site, and a device to work the method. The method includes the steps of: importing two or more data sources having geographic data of the geographic area; selecting a first control in a first data source of the two or more data sources and the same first control in a second data source of the two or more data sources; selecting a second control in the first data source and the same second control in the second data source; and applying an algorithm in a processor to process the first control in the first data source, the first control in the second data source, the second control in the first data source and the second control in the second data source by overlaying, rotating and scaling the data sources until at least the first control in the first data source matches the first control in the second data source and the second
(Continued)

control in the first data source matches the second control in the second data source.

22 Claims, 5 Drawing Sheets

(51) Int. Cl.
*G01C 11/10* (2006.01)
*G01C 11/06* (2006.01)
*G06T 7/33* (2017.01)
*G06T 17/05* (2011.01)
*G06Q 50/02* (2012.01)

(52) U.S. Cl.
CPC .......... *G06T 3/0006* (2013.01); *G06T 3/0068* (2013.01); *G06T 7/33* (2017.01); *G06T 17/05* (2013.01); *G06Q 50/02* (2013.01); *G06T 2207/10028* (2013.01); *G06T 2207/10032* (2013.01); *G06T 2207/20101* (2013.01); *G06T 2207/30181* (2013.01)

(58) Field of Classification Search
CPC . G06T 2207/30181; G06T 2207/10032; G06T 2207/20101; G01C 11/10; G01C 11/06; G06Q 50/02
USPC ........................................................ 382/294
See application file for complete search history.

(56) References Cited

OTHER PUBLICATIONS

International Preliminary Report on Patentability (PCT/AU2015/050809), dated Apr. 20, 2017.
Georeferencing A Raster Dataset—https://web.archive.org/web/20100812061109/http:/webhelp.esri.com/ arcgisdesktop/9.3/index.cfm?TopicName=Georeferencing_a_raster_dataset; published on Mar. 27, 2012 as per Wayback Machine.

* cited by examiner

GEO-POSITIONING

CROSS REFERENCE TO RELATED APPLICATION

This application is a national stage application of PCT/AU2015/050809, filed Dec. 18, 2015, which claims priority to Australian Patent Application No. 2014905133, filed Dec. 18, 2014, the disclosures of which are hereby incorporated by reference in their entirety.

FIELD OF THE INVENTION

The present invention relates to a method and apparatus for combining different sources of geographic data for easy visualisation. The invention finds particular application in combining mine survey data with radar safety data for enhanced visualisation by a user when making key mine risk management decisions.

BACKGROUND TO THE INVENTION

A vast array of geographic information is available today from numerous sources. These include topographic maps, aerial photographs, satellite imagery, laser scan point clouds, survey data, digital elevation models, mine plans, mine maps, hazard maps, radar data and others. In the mining field a mine operator may use several of these data sources when planning and operating a mine. The Inventors are particularly interested in open pit mines, but the issues discussed herein are applicable to underground mining as well as geographic visualisation tasks outside the mining industry.

There are generally two approaches for monitoring slopes in an open pit mine—targeted (tactical) monitoring and broad area (strategic) monitoring. Targeted monitoring is a tactical approach that is critical for monitoring existing slope movements posing a potential or immediate threat to the safety or productivity of mining operations. Broad area monitoring is a strategic approach that is helpful to detect 'hot spots' of movement activity even in areas that are not critical to current mine operations. This approach is helpful for planning, especially if areas are identified before they become closely or directly linked with active mining operations.

Slope stability radars have been generically described as either 3D radar or 2D radar. 3D radar (for example Ground-Probe® SSR-XT) scans the slope in increments of azimuth, elevation and range, while 2D radar (for example Ground-Probe® SSR-FX and SSR-SARx) scans the slope in increments of azimuth and range only. 3D radar is the preferred option for targeted (tactical) monitoring, and 2D radar for broad area (strategic) monitoring.

Most mines operate from a mine map that uses a mine coordinate system that may or may not be related to a real world coordinate system such as an ordinance survey grid reference or latitude and longitude. Mine operators seek to integrate other data sources, such as radar data and aerial photography, onto the mine coordinate system. Users however prefer to operate from visual cues rather than coordinate systems. Thus a mine manger may refer to a "bend in the haul road" or "the second bench" rather than a specific grid reference. There is therefore a need to present a visualisation of the mine site with accurate overlay of sources of geographic data.

In our original patent specification (see international patent publication WO 2002/046790) we addressed this desire by providing a visual image camera, a radar, and a process of coordinate registration to match the radar data to the visual image. This is useful if the radar data and visual data are from the same location, but it does not provide a mechanism for introducing other data sources unless a common geo-reference exists.

A current practice used by mine operators is to utilise qualified surveyors with sophisticated survey tools (such as total stations or differential GPS) to geo-reference the radar and radar data to the mine coordinate system, thereby enabling integration of disparate data. However, it can be costly and difficult to arrange for a qualified surveyor with expensive survey equipment to take the survey measurements when required, which causes delays in making key decisions around safety and productivity of the mine. Radar is an accepted safety best practice in mining and often mining cannot happen without radar monitoring; a delay in mining can cost millions of dollars per day in operating costs and lost production tonnes. This is especially true when radar systems are regularly moved around the mine to avoid blast damage or to monitor different mining areas using the same instrument.

An alternate practice is to use unqualified but more readily available personnel to use the same sophisticated survey tools that are integrated with the radar system to conduct the same task, but this adds more cost to the radar system and can introduce errors through incorrect use of these sophisticated survey tools.

For 2D and 3D radars operating at mine sites, the required spatial accuracy to geo-reference the radar data to the mine coordinate system does not need to be accurate to survey-quality (ie. within centimeters), rather in the order of meters is sufficient. This is because the spatial resolution of 2D and 3D radar systems depends on range and geometry, and is typically in the order of square meters rather than being points. Furthermore, slope movements occur over areas of the order of square meters on the slope face, so effort trying to geo-reference radar data to survey-quality points of centimeter accuracy in 3D space is wasted and inefficient.

In the current state of the art, radar data is combined with computer generated models called digital terrain maps (DTM) due to the current reliance on a limited number of proprietary data formats that contain geo-referenced coordinates. There is a wide range of other disparate data sources that are used by mines, such as photogrammetry data, aerial photos, lidar data, satellite data and the like. These disparate data sources often have proprietary data formats that are incompatible, some are 2D and others 3D, some are mine geo-referenced, others are not. Often disparate data sources are unable to be combined due to these inherent limitations, and currently are not combinable with radar data. There is great value synergy for mine operators to combine these disparate data formats together and with radar data. What is needed is the ability to combine these in a more simple way that references data sources to each other with or without a mine coordinate system. A simple method includes converting these to standard image formats such as jpg, gif, tiff, bmp, pdf and the like or to standard 3D formats, then combining them through the geo-positioning process.

An object of this invention is to geo-position data from two or more sources, one of which is preferably radar data, to within sufficient spatial accuracy for the application without the requirement for qualified surveyors or expensive survey tools, thereby reducing the cost and minimising delays.

SUMMARY OF THE INVENTION

In one form, although it need not be the only or indeed the broadest form, the invention resides in a method of geo-positioning geographic data for visualisation of a geographic area including the steps of:
importing two or more data sources having geographic data of the geographic area;
selecting a first control in a first data source of the two or more data sources and the same first control in a second data source of the two or more data sources;
selecting a second control in the first data source and the same second control in the second data source;
applying an algorithm in a processor to process the first control in the first data source, the first control in the second data source, the second control in the first data source and the second control in the second data source by overlaying, rotating and scaling the data sources until at least the first control in the first data source matches the first control in the second data source and the second control in the first data source matches the second control in the second data source.

Suitably the geographic area is a mine site and preferably an open pit mine site.

Suitably the method further includes the step of generating a view of the geographic area from each data source and displaying the two or more views on a graphical user interface. In this case, the step of selecting controls may suitably be performed by a user selecting the first control in a first view of the two or more views and the same first control in a second view of the two or more views; and selecting the second control in the first view and the same second control in the second view. The step of overlaying, rotating and scaling is suitably performed by overlaying, rotating and scaling the views until at least the first control in the first view matches the first control in the second view and the second control in the first view matches the second control in the second view.

One of the two or more data sources is preferably a radar data source which may be a 2D source or a 3D source.

The other data source may suitably be selected from one of: a visual image (photographic, aerial, satellite); a mine plan; a topographic survey map; a digital elevation model (DEM); photogrammetry; a laser point cloud.

The controls are preferably selected to be easily identifiable locations visible in both the first view and the second view. The step of selecting controls may be performed by a user or may be automated. Controls can be points, lines, 2D or 3D shapes, 2D or 3D regions or combinations of these. Controls can be manually selected or automatically selected by a computer algorithm. In the case of automatic selection the controls are identified from features or patterns common in both data sources.

Further features and advantages of the present invention will become apparent from the following detailed description.

BRIEF DESCRIPTION OF THE DRAWINGS

To assist in understanding the invention and to enable a person skilled in the art to put the invention into practical effect, preferred embodiments of the invention will be described by way of example only with reference to the accompanying drawings, in which.

DETAILED DESCRIPTION OF THE INVENTION

Embodiments of the present invention reside primarily in method of geo-positioning geographic data. Accordingly, the method steps have been illustrated in concise schematic form in the drawings, showing only those specific details that are necessary for understanding the embodiments of the present invention, but so as not to obscure the disclosure with excessive detail that will be readily apparent to those of ordinary skill in the art having the benefit of the present description.

In this specification, adjectives such as first and second, left and right, and the like may be used solely to distinguish one element or action from another element or action without necessarily requiring or implying any actual such relationship or order. Words such as "comprises" or "includes" are intended to define a non-exclusive inclusion, such that a process, method, article, or apparatus that comprises a list of elements does not include only those elements but may include other elements not expressly listed, including elements that are inherent to such a process, method, article, or apparatus.

Figure 1:
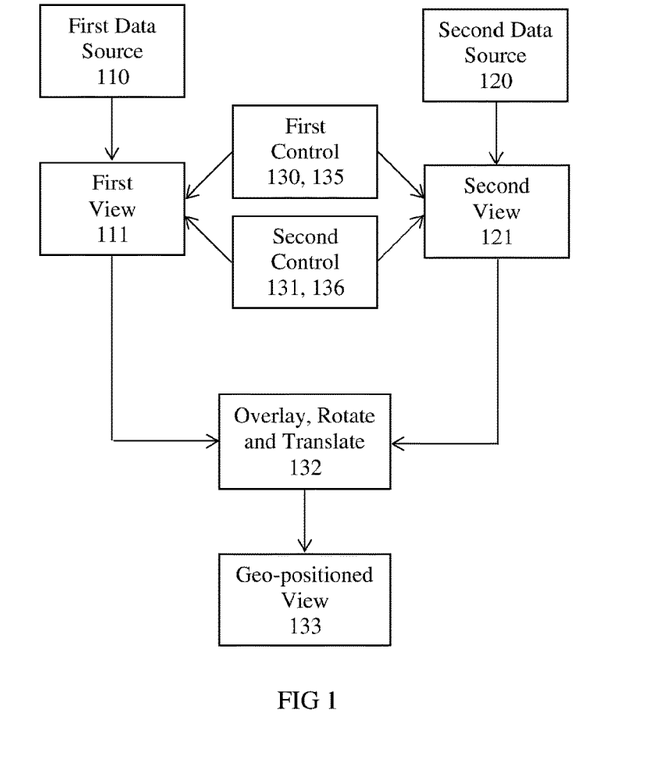
FIG. 1 is a flowchart of the method of geo-positioning geographic data.

Referring to FIG. 1 there is shown a flowchart of a method of geo-positioning geographic data, in particular in relation to a mine site. The method commences with a first source of data 110 and at least a second source of data 120. A first view 111 is generated from the first source of data 110 and a second view 121 is generated from the second source of data 120. The first view 111 and the second view 121 are of the same geographic area, or at least overlap to a significant degree.

Figure 2:
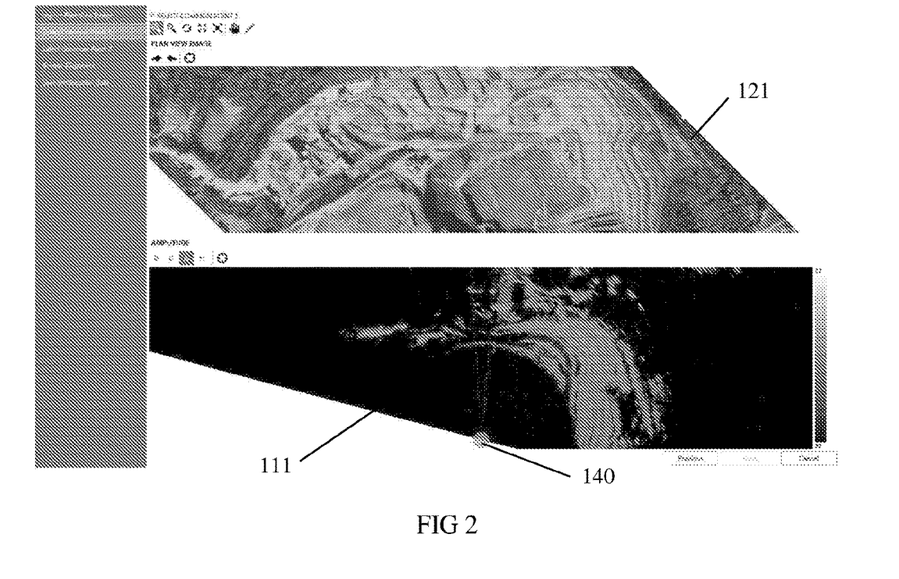
FIG. 2 is a screenshot of a graphical user interface useful for an embodiment of the invention.

By way of example, the first source of data 110 may be radar data of an open pit mine obtained from a Ground-Probe® SSR slope stability radar from which a radar image is generated as shown in the bottom view 111 of FIG. 2. The second source of data 120 may be an aerial photograph of the same open pit mine from which a visual image is generated as shown in the top view 121 of FIG. 2. The location of the radar is shown as a dot 140 in the first view 111.

There are numerous alternate sources of data that can be used. For instance, the radar data could be 2D data such as obtained from a GroundProbe® SSR-FX radar, SSR-SARx radar or 3D data such as obtained from a GroundProbe® SSR-XT radar. Other 2D sources of data include visual images, mine plans and maps. Other sources of 3D data include digital elevation models (DEM), photogrammetry, laser generated point clouds, triangulated mesh surfaces, 3D topographic models or line maps known as toes and crests.

Figure 3:
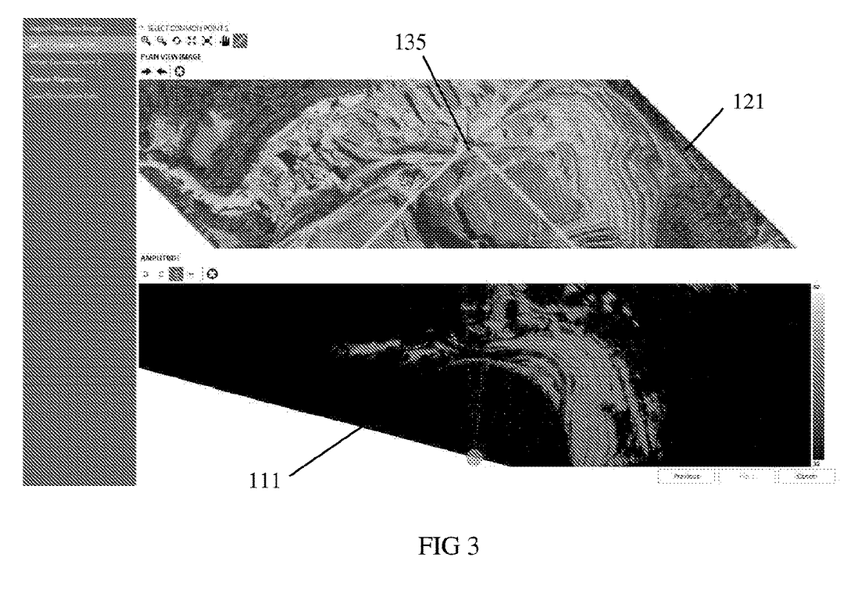
FIG. 3 is a screenshot of the step of selecting a first control in a second view.
Figure 4:
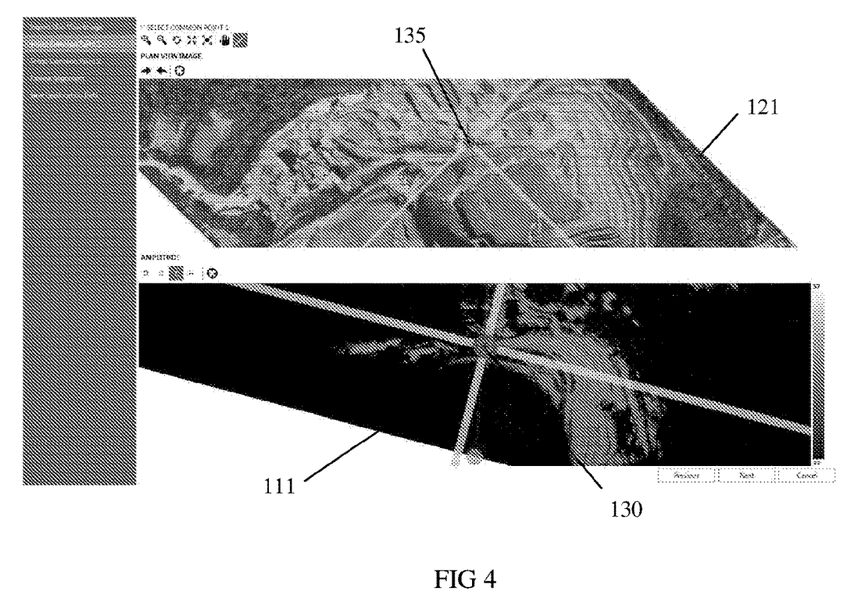
FIG. 4 is a screenshot of the step of selecting the first control in the first view at the same location.

A first control 130 is selected in the first view 111 and another first control 135 is selected in the second view 121 such that the first control 130 in the first view 111 matches the same location as the first control 135 in the second view 121. FIG. 3 shows the first control 135 (which is a corner of a waste dump) selected in the second view 121 and FIG. 4 shows the first control 130 selected in the first view 111 (which is the same corner of a waste dump).

Figure 5:
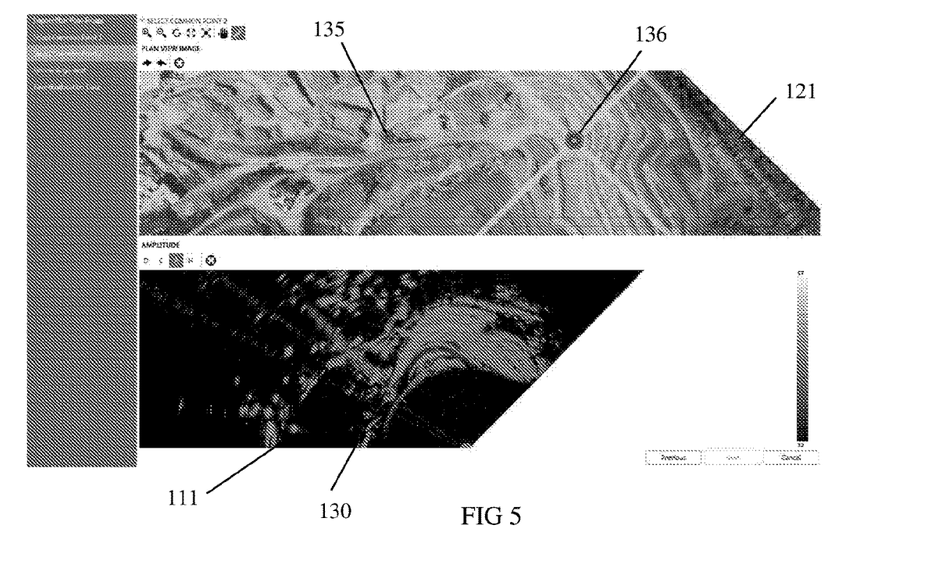
FIG. 5 is a screenshot of the step of selecting a second control in the second view.
Figure 6:
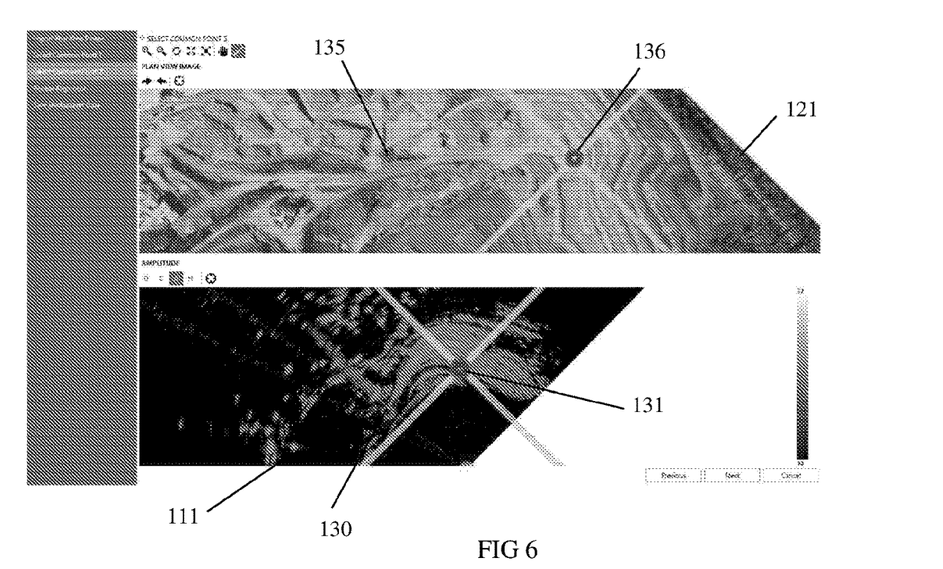
FIG. 6 is a screenshot of the step of selecting the second control in the second view at the same location.

A second control 131 is selected in the first view 111 and another second control 136 is selected in the second view 121 such that the second control 131 in the first view 111 matches the same location as the control 136 in the second view 121. FIG. 5 shows the second control 136 selected in the second view 121 and FIG. 6 shows the same second control 131 in the first view 111. The location selected is the top of a bench near a bend in a haul road. This is an easily identifiable location in both the radar image and the photo image. Note that in FIG. 5 and FIG. 6 the views have been rotated by the user for the convenience of selecting the second controls.

For the purposes of description only two controls are considered, however a person skilled in the art will realize that more controls may produce a better result. Nonetheless, the inventors have found that in many cases two controls are adequate. The controls may be selected by the user in various ways. One useful way is to provide a touch sensitive display showing the first view and the second view so that a user may touch the screen to choose each control.

Figure 7:
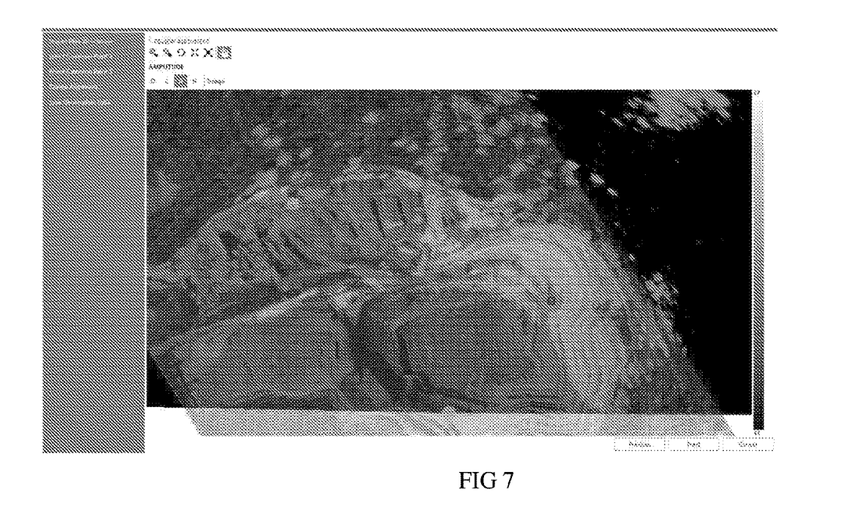
FIG. 7 is a screenshot after geo-positioning.

Referring back to FIG. 1, an algorithm 132 translates, rotates and scales the first view 111 and the second view 121 until the first controls 130, 135 and the second controls 131, 136 are coincident when the first view 111 and the second view 121 are overlaid. The result is shown in FIG. 7 with some transparency applied so features from both images are observable. The display is conveniently provided with various other elements to adjust the appearance of the first view, second view and combined view, such as adjusting transparency.

Figure 8:
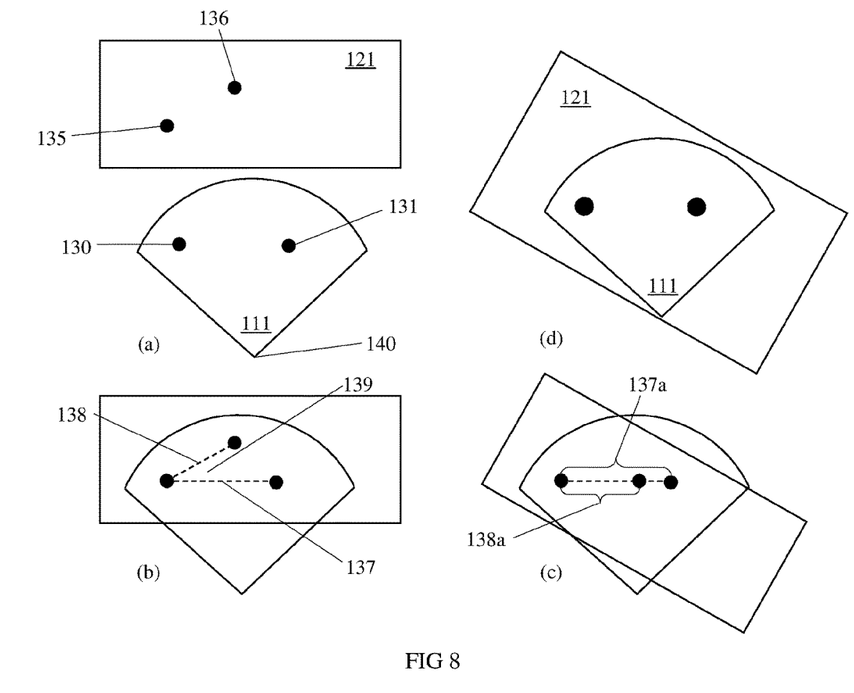
FIG. 8 is a schematic depiction of the alignment algorithm.

One example of a suitable algorithm 132 is described by reference to FIG. 8. The algorithm performs the following steps to the first view 111 and the second view 121 shown in (a):

1. The first view 111 is translated onto the second view 121 such that the first control 130 of the first view 111 is co-located with the first control 135 of the second view 121, as shown in (b);
2. A first straight line fit 137 is determined between the first control 130 of first view 111 and the second control 131 of the first view 111, as shown in (b);
3. A second straight line fit 138 is determined between the first control 135 of the second view 121 and the second control 136 of the second view 121, as shown in (b);
4. The angle 139 is determined between the first straight line fit 137 and the second straight line fit 138, as shown in (b);
5. The second view 121 is rotated by the angle 139 such that the first straight line fit 137 and the second straight line 138 fit is collinear, as shown in (c);
6. A scaling factor is determined as the ratio of the first straight line fit length 137*a* and the second straight line fit length 138*a;*
7. The second view 121 is then scaled by the scaling factor whilst maintaining the aspect ratio such that the second control 136 in the second view 121 is co-located with the second control 131 in the first view 111, as shown in (d).

Figure 9:
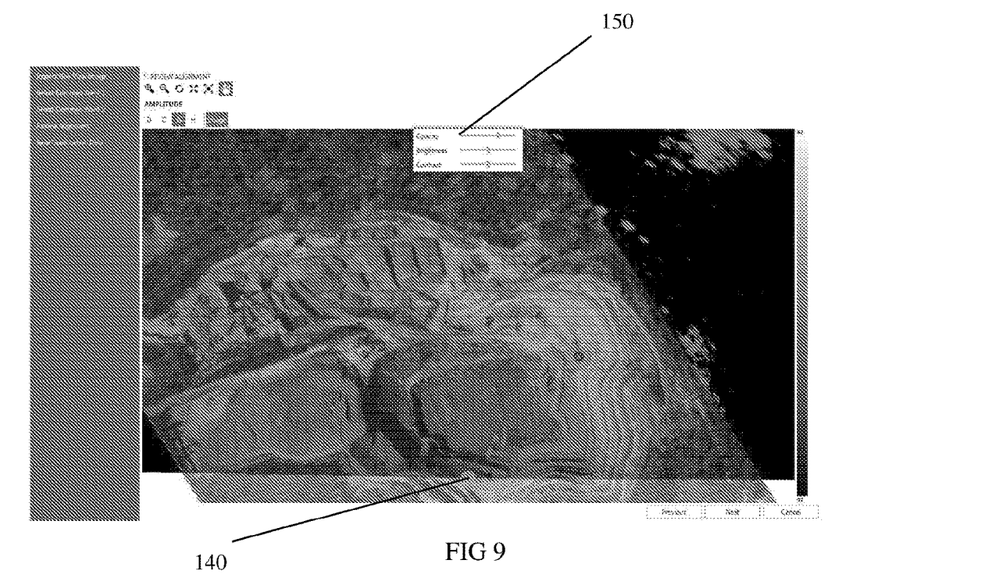
FIG. 9 is a screenshot showing opacity control.

The user may then review the alignment of the views for best geo-positioning fit. To assist this process the opacity of one of the views may be adjusted with an opacity slide scale 150 as shown in FIG. 9. The user may then judge whether the features evident in one view are sufficiently aligned with features in the other view. For example, the user can check that the radar location 140 is correctly located in both views. Alternatively the process can be started again with different controls or a control adjustment or refinement process.

Figure 10:
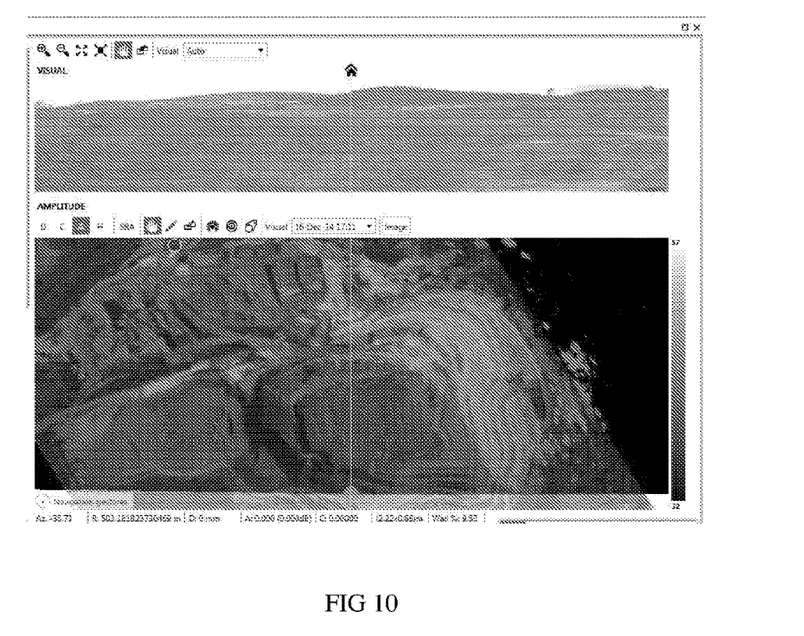
FIG. 10 is a screen shot showing the use of the geo-positioned geographic data used for mine management.

When the user is satisfied with the geo-positioning process the geo-positioned geographic data will be available for visualization and used in various visualization tools, for example the display tool shown in FIG. 10 and described in our pending international application PCT/AU2014/050395.

The preferred embodiment has been described by reference to views generated from the data sources and displayed in a graphical user interface. It will be appreciated that in another embodiment the process is automated and operates directly on the source data. For instance, controls are identified from features or patterns common in both data sources, for example common points or common lines or common shapes.

The invention is performed without reference to any particular coordinate system. The invention relies upon identifying controls identifiable in the data sources and then aligning the data sources based on the controls. Nonetheless, the radar data has its own coordinate system of polar coordinates based around the location of the radar. The radar coordinate system can be applied, for example, to the display of FIG. 10, which is described in co-pending international application number PCT/AU2014/050395. Other sources of data will also have a coordinate system, such as the universal coordinate system of ordnance survey data, which may be used. The mine will likely have its own coordinate system which can be applied if the source data includes a mine map. Because the invention is coordinate system independent it can adopt any available coordinate system as preferred by the user.

In many mine applications the mine map or aerial photograph may already be geo-referenced by high accuracy surveying. If the mine map or aerial photograph is one of the data sources the result is that all data sources geo-positioned with the geo-referenced mine map or aerial photograph will be geo-referenced. If none of the data sources are geo-referenced the user can select two or more points to geo-reference by manual survey and this will lead to all data sources being geo-referenced. This represents a significant saving in time and energy compared to separately geo-referencing all data sources.

The geo-positioning method described above facilitates various approaches to viewing data obtainable from a mine site. For instance, if the first data source is 2D radar generated data and the second data source is 2D mine representative data, then the radar generated data can be overlayed on the mine representative data but this will have a projection error which may be tolerable depending on mine geometry. The projection error is due to distortion between radar range measurements and plan projection distances.

If the first data source is 3D radar generated data and the second data source is 2D mine representative data, then the mine representative data can be draped on the radar generated data but again this will have a projection error which may be tolerable depending on mine geometry.

If the first data source is 2D or 3D radar generated data and the second data source is 3D mine representative data geo-referenced to the mine coordinate system, then the 3D radar location and radar orientation (heading) can be determined. This enables radar generated data to be draped over the 3D mine representative data without any projection error. This is called a corrected 3D drape.

Furthermore, the corrected 3D drape can be projected to a 2D image in meters×meters, which is 1:1 to a map overlay.

Alternatively, the corrected 3D drape can be projected to a 2D image in angle×angle, which is a 1:1 to a visual photograph overlay.

Alternatively, the corrected 3D drape can be projected to a 2D image in angle×meters or meters×angle, which is 1:1 to other radar coordinates.

A particular advantage of the method described herein is that it facilitates more efficient utilization of radar resources, and other sensitive equipment. As mentioned above, it is necessary to move sensitive equipment, such as radar safety equipment, to avoid damage from blasting. The above method can be used to stitch radar generated data from slightly different radar locations during different monitoring episodes by using the geo-positioning method to translate and rotate the first generated radar data and second generated radar data from different monitoring episodes. For example, when the radar is moved away and then located roughly but not exactly in the same location, the geo-positioning method can be used to rotate and translate the radar data to achieve alignment from slightly different views and to combine separate monitoring episodes into one continuous monitoring episode.

It will also be appreciated that the geo-positioning method results in a relationship between the first view 111 and the second view 121. This means that a user can select a region of the first view and it can be highlighted in the second view, and vice versa. In particular, a cursor location in the first view can be highlighted in the second view, or vice versa. Similarly, a region of the second view can be selected, which is highlighted in the first view.

With the geo-positioning process a radar system can be set up quickly and visualisation of radar data and other geographic data is provided without the use of surveyors or requiring timely and complex importation of data limited to proprietary formats. This is particularly advantageous when needing to quickly analyse a mine wall for failure, or when surveyors or other suitably qualified technicians are unavailable.

The geo-positioning process described above provides an easier, but less accurate process of locating and orientating a radar in the mine DTM compared to geo-referencing. As such, the geo-positioning process is advantageous where it is desirable to quickly set up and combine radar and other geographic data for monitoring of an area.

The invention has been described by particular reference to mine monitoring situations which are envisaged to be a primary application. However, the invention is not limited to mine monitoring situations. The inventors consider that the invention will also be applicable to monitoring any geographic area that is at risk of landslide. Another application is in building construction where ground movement is monitored for subsidence during construction. The inventors consider the building construction application to be quite significant for monitoring geographic areas that are subject to high density construction, such as a high rise building adjacent a road or rail tunnel.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

The invention claimed is:

1. A method of geo-positioning geographic data for visualisation of a mine site including the steps of:
    importing two or more data sources having geographic data of the mine site, at least one of the two or more data sources being a radar or lidar monitoring slope stability of the mine site;
    selecting a first topographic control point in a first data source of the two or more data sources and the first topographic control point in a second data source of the two or more data sources; selecting a second topographic control point in the first data source and the second topographic control point in the second data source;
    applying an algorithm in a processor to process the first topographic control point in the first data source, the first topographic control point in the second data source, the second topographic control point in the first data source and the second topographic control point in the second data source by overlaying, rotating and scaling the first data source and the second date source until at least the first topographic control point in the first data source matches the first topographic control point in the second data source and the second topographic control point in the first data source matches the second topographic control point in the second data source.

2. The method of claim 1 wherein the algorithm performs the steps of:
    (a) translating the first data source onto the second data source such that the first topographic control point of the first data source is co-located with the first topographic control point of the second data source;
    (b) fitting a first straight line between the first topographic control point of the first data source and the second topographic control point of the first data source;
    (c) fitting a second straight line between the first topographic control point of the second data source and the second topographic control point of the second data source;
    (d) determining the angle between the first straight line and the second straight line;
    (e) rotating the second data source by an angle such that the first straight line and the second straight line are collinear;
    (f) determining a scaling factor as a ratio of the first straight line length and the second straight line length;
    (g) scaling the second data source by the scaling factor whilst maintaining an aspect ratio such that the second topographic control point in the second data source is co-located with the second topographic control point in the first data source.

3. The method of claim 1 wherein the mine site is an open pit mine site or an underground mine site.

4. The method of claim 1 further including the step of generating a view of the geographic area from each data source and displaying the two or more views on a graphical user interface.

5. The method of claim 4 wherein the step of selecting controls is performed by a user selecting the first topographic control point in a first view of the two or more views and the first topographic control point in a second view of the two or more views; and selecting the second topographic control point in the first view and the second topographic control point in the second view.

6. The method of claim 1 wherein the other data source is selected from one of: a visual image (photographic, aerial, satellite); a mine plan; a topographic survey map; a digital elevation model (DEM); photogrammetry; a laser point cloud.

7. The method of claim 1 wherein the topographic control points are selected to be easily identifiable locations in both the first data source and the second data source.

8. The method of claim 1 wherein the topographic control points are selected from: points, lines, 2D or 3D shapes, 2D or 3D regions or combinations of these.

9. The method of claim 1 where the data source from the radar or lidar is in range coordinates (angle, angle, range) and the method includes the further step of converting the radar or lidar data source to mine coordinates (northings, eastings, height).

10. The method of claim 1 further including the step of converting the geo-positioned geographic data to mine coordinates (northings, eastings, height).

11. A method of geo-positioning geographic data for visualisation of a mine site including the steps of:
importing two or more data sources having geographic data of the mine site, at least one of the two or more data sources being a radar or lidar monitoring slope stability of the mine site;
selecting a first topographic control point in a first data source of the two or more data sources and the same first topographic control point in a second data source of the two or more data sources; selecting a second topographic control point in the first data source and the second topographic control point in the second data source;
applying an algorithm in a processor to process the first topographic control point in the first data source, the first topographic control point in the second data source, the second topographic control point in the first data source and the second topographic control point in the second data source by overlaying, rotating and scaling the data sources until at least the first topographic control point in the first data source matches the first topographic control point in the second data source and the second topographic control point in the first data source matches the second topographic control point in the second data source;
wherein the algorithm performs the steps of:
(a) translating the first data source onto the second data source such that the first topographic control point of the first data source is co-located with the first topographic control point of the second data source;
(b) fitting a first straight line between the first topographic control point of the first data source and the second topographic control point of the first data source;
(c) fitting a second straight line between the first topographic control point of the second data source and the second topographic control point of the second data source;
(d) determining an angle between the first straight line and the second straight line;
(e) rotating the second data source by the angle such that the first straight line and the second straight line are collinear;
(f) determining a scaling factor as a ratio of the first straight line length and the second straight line length;
(g) scaling the second data source by the scaling factor whilst maintaining an aspect ratio such that the second topographic control point in the second data source is co-located with the second topographic control point in the first data source.

12. A device for geo-positioning geographic data of a mine site comprising:
memory storing two or more data sources having geographic data of the mine site wherein at least one of the two or more data sources being a radar or lidar monitoring slope stability of the mine site;
a processor programmed with an algorithm to:
select a first topographic control point in a first data source of the two or more data sources and the first topographic control point in a second data source of the two or more data sources;
select a second topographic control point in the first data source and the second topographic control point in the second data source;
apply an algorithm to process the first topographic control point in the first data source, the first topographic control point in the second data source, the second topographic control point in the first data source and the second topographic control point in the second data source by overlaying, rotating and scaling the data sources until at least the first topographic control point in the first data source matches the first topographic control point in the second data source and the second topographic control point in the first data source matches the second topographic control point in the second data source; and
a display presenting a visualisation of the mine site with geo-positioned views of at least the first data source and the second data source.

13. The device of claim 12 wherein the display is a touch sensitive display and the first topographic control point and the second topographic control point are selected by a user touching the display.

14. The device of claim 12 wherein the display includes elements to adjust an appearance of the first view, second view and geo-positioned view.

15. The method of claim 11 further including the step of converting the geo-positioned geographic data to mine coordinates (northings, eastings, height).

16. The method of claim 11 wherein the mine site is an open pit mine site or an underground mine site.

17. The method of claim 11 further including the step of generating a view of the geographic area from each data source and displaying the two or more views on a graphical user interface.

18. The method of claim 17 wherein the step of selecting controls is performed by a user selecting the first topographic control point in a first view of the two or more views and the first topographic control point in a second view of the two or more views; and selecting the second topographic control point in the first view and the second topographic control point in the second view.

19. The method of claim 11 wherein the other data source is selected from one of: a visual image (photographic, aerial, satellite); a mine plan; a topographic survey map; a digital elevation model (DEM); photogrammetry; a laser point cloud.

20. The method of claim 11 wherein the topographic control points are selected to be easily identifiable locations in both the first data source and the second data source.

21. The method of claim 1 wherein the topographic control points are selected from: points, lines, 2D or 3D shapes, 2D or 3D regions or combinations of these.

22. The method of claim 11 where the data source from the radar or lidar is in range coordinates (angle, angle, range) and the method includes the further step of converting the radar or lidar data source to mine coordinates (northings, eastings, height).

* * * * *